United States Patent [19]

Russell et al.

[11] Patent Number: 4,864,546
[45] Date of Patent: Sep. 5, 1989

[54] VIBRATOR SEISMIC DATA CORRELATION SYSTEM

[75] Inventors: William F. Russell, Dallas; William T. McDavid, Allen; Robert A. Baker, Murphy, all of Tex.

[73] Assignee: Terra Marine Engineering, Inc., Dallas, Tex.

[21] Appl. No.: 29,078

[22] Filed: Mar. 23, 1987

[51] Int. Cl.$^4$ .............................................. G01V 1/28
[52] U.S. Cl. ..................................... 367/41; 367/189
[58] Field of Search ....................... 367/39, 40, 41, 42, 367/46, 189, 190, 77; 181/114, 121

[56] References Cited

U.S. PATENT DOCUMENTS

| | | | |
|---|---|---|---|
| 4,069,470 | 1/1978 | Cunningham et al. | 367/41 |
| 4,188,611 | 2/1980 | Edwards et al. | 367/41 |
| 4,646,274 | 2/1987 | Martinez | 367/41 |

OTHER PUBLICATIONS

"Seismic Vibrator Control & the Downgoing P-wave," Geophysics, vol. 49, #6, Jun. 1984.

Primary Examiner—Thomas H. Tarcza
Assistant Examiner—Ian J. Lobo
Attorney, Agent, or Firm—Ross, Howison, Clapp & Korn

[57] ABSTRACT

A seismic data processing system utilizes vibration type shock waves which are delivered by a reactive mass (52) acting in conjunction with a base plate (50) to output low frequency shock waves to the earth. The force signals for the reactive mass (52) and (50) are measured and input to a transmitter (42) for transmission to a receiver (48) at a control center (28) which also receives resultant measured data. The measured force signal is input to a data correlator (74) as a model signal and correlated with the resultant data to provide processed data out.

14 Claims, 3 Drawing Sheets

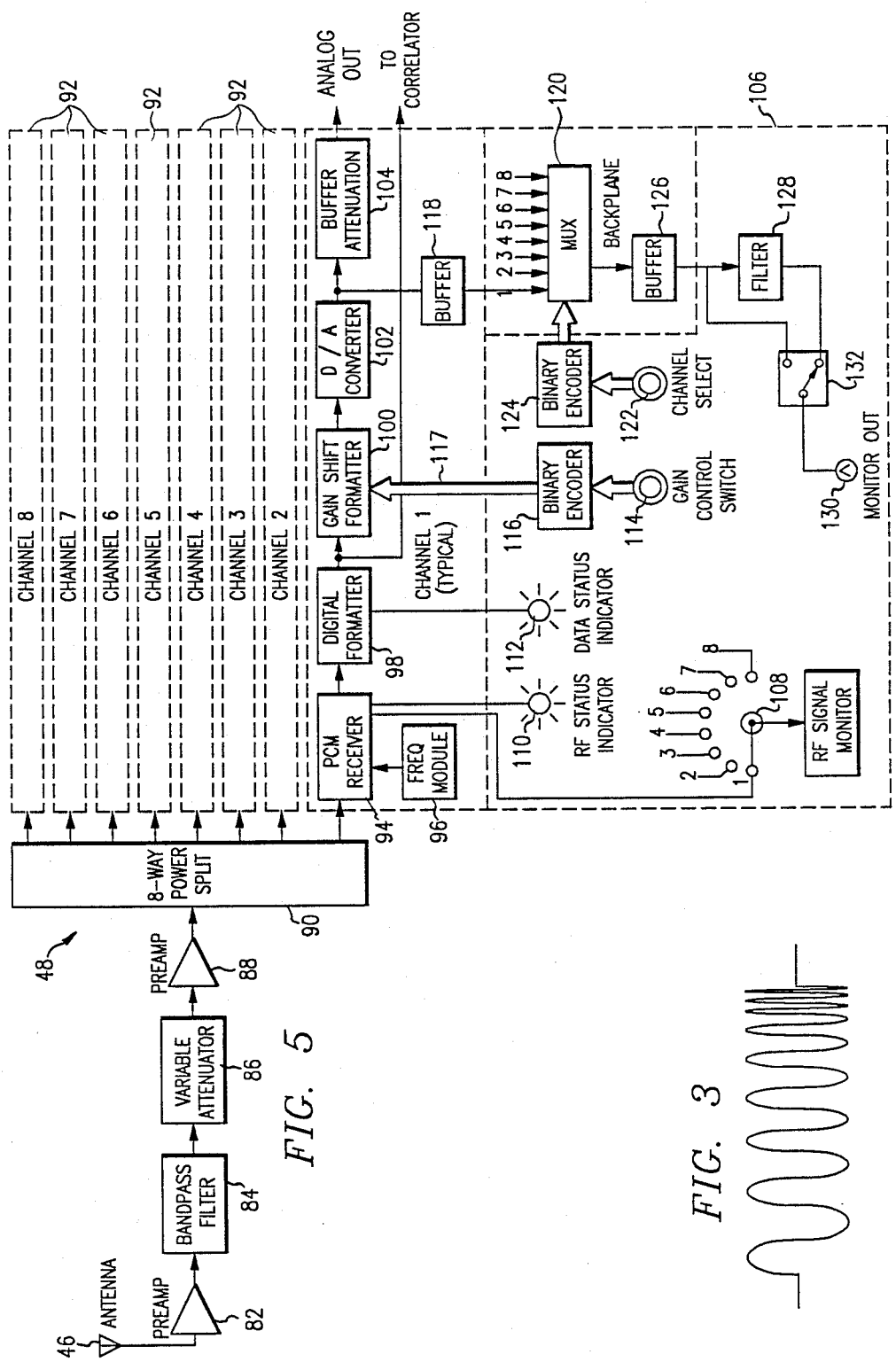

4,864,546

VIBRATOR SEISMIC DATA CORRELATION SYSTEM

TECHNICAL FIELD OF THE INVENTION

The present invention pertains in general to seismic measurement systems and, more particularly, to a seismic system utilizing vibration type energy sources for inputting a signal into the earth at a predetermined sweep frequency.

BACKGROUND OF THE INVENTION

Seismic measurement systems typically have some form of energy source to transmit an impulse of energy into the earth which, when reflected from various substructures in the earth, can be measured at the earth's surface with the use of sensors. This information is then collected and correlated with the input energy to provide a translation of the structural arrangement beneath the earth's surface.

One type of system for performing the seismic measurement utilizes a vibrating base plate that is vibrated at a relatively low frequency of between 5-100 Hz. Normally, the frequency of vibration is swept over this range, which vibration energy is transmitted to the earth through the vibration plate. Sensors are arranged in the earth along a line and spaced apart approximately 25-50 meters. The vibration device is moved along this line of sensors, placed upon the ground at predetermined points and the vibration energy transmitted to the earth. Along the line of sensors or elsewhere, a recording station is located which receives the output from each of the sensors. This data is collected and input to one input of a data correlator. The other input of the correlator is a model of what the output energy of the vibration device is expected to be.

Typically, each of the vibration devices has a reference oscillator located on board which is triggered to sweep from between a low frequency and a high frequency in one or several sweeps. If multiple vibration devices are utilized, they are all triggered at the same time. However, for the data correlator to work, optimally it is desirable for the model swept frequency to have the same amplitude and phase relationship within all vibration type devices in order to provide accurate results.

In present vibrator systems, each of the vibration devices is calibrated against a reference oscillator at the recording station, which reference oscillator is used to input the model input signal to the data correlator. However, there exists a possibility that there can be some deviation of phase and/or amplitude between the vibration devices themselves as well as deviation from the reference at the recording station. To insure the integrity of the data, systems in the past have calibrated this frequency and phase relationship prior to initiating a measurement sequence and then have checked it again at a later time. If the deviation is minimum, this provides some confidence in the integrity of the measurement. However, this approach does not take into account any of the practical limitations of the vibration devices in transmitting the swept frequency vibration to the earth. Any variations will result in noise and, thus, inaccurate data.

SUMMARY OF THE INVENTION

The present invention disclosed and claimed herein comprises a seismic system for collecting and correlating seismic data. The system uses a plurality of vibration trucks for imparting a low frequency shock wave to the earth at a select position. Accelerometers are provided for measuring the force of the shock wave imparted to the earth by each of the vibration trucks to provide a proportional force signal from each of the trucks representative of the respective forces. Sensors are provided for measuring reflected shock waves from the earth to provide measured data. A transmitter is provided at each of the vibration trucks for acquiring and encoding the respective force signal and transmitting it over a wireless transmission link. A receiver is provided at a central location for receiving and decoding the encoded force signals to thereby provide decoded force signals. The decoded force signals are converted to a model force signal by taking the average thereof. The model force signal and the measured data are then input to a data correlator to correlate the data and to output processed data therefrom.

In a further embodiment of the present invention, the vibrator trucks each comprise a reactive mass and a base plate cooperating together such that the reactive mass imparts a force to the base plate which is adjacent the earth. Both the force imparted the reactive mass and also the force imparted to the base plate are measured and transmitted to the central location. These signals proportionate to force are then weighted to provide a weighted force signal for input to the data correlator.

BRIEF DESCRIPTION OF THE DRAWINGS

For a more complete understanding of the present invention and the advantages thereof, reference is now made to the following description taken in conjunction with the accompanying Drawings in which:

FIG. 3 illustrates the swept frequency utilized to vibrate the base plate of the vibration device;

FIG. 5 illustrates a schematic block diagram of the receiver; and

DETAILED DESCRIPTION OF THE INVENTION

Figure 1:
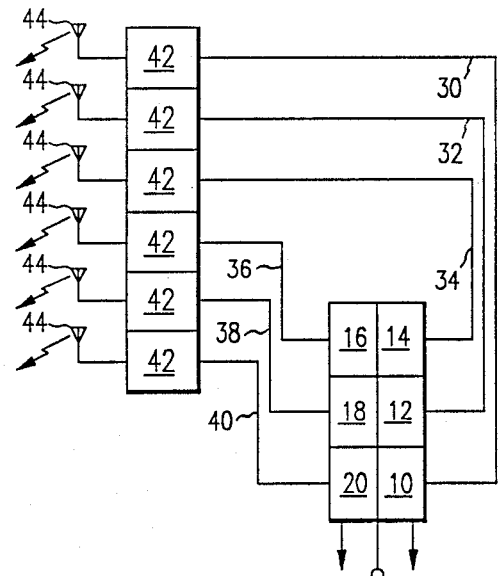
FIG. 1 illustrates a schematic diagram of a vibration seismic telemetry system.

Referring now to FIG. 1 there is illustrated a schematic block diagram of a vibration type seismic measurement system. Each of the seismic vibration systems utilizes one or more vibration trucks, each of which has a base plate which is operable to rest against the ground and a reactive mass. One type of vibrator truck is manufactured by Heaviquip Engineering and Manufacturing Inc., Model No. HEMI 50.

The vibrator trucks themselves constitute the reactive mass, and they have attached thereto a plate which can be hydraulically lowered to the ground such that the truck itself lifts off the ground. The hydraulic system for lifting the truck can then be connected in a servo loop which is utilized to control the vibration of the truck body, which is raised above the ground, at the selected rate. Typically, the vibration frequency is swept from a frequency of approximately five Hz to a frequency of approximately 120 Hz. This is a conventional system.

In FIG. 1, six vibration trucks 10, 12, 14, 16, 18 and 20 are arranged in groups of two along a line 22. Along the line 22 a plurality of sensors 24 are disposed and interconnected by cables. The cables all run in a group of cables 26 to a control center 28. The vibration energy that is imparted to the earth by the vibration trucks 10-20 is reflected off of structures such as dense rock beneath the earth's surface and picked up by the sensors 24. The sensors 24 are spaced evenly in increments of 25 to 50 meters, depending upon the information to be retrieved.

Each of the vibration trucks 10-20 are operable to measure the actual frequency and amplitude or force transmitted to the ground, which force signal is output on lines 30, 32, 34, 36, 38 and 40, respectively, to a separate transmitter 42. The transmitter 42 is operable to encode this information and transmit it on a various number of channels through an antenna 44 to a receive antenna 46 and a receiver 48. The receiver 48 decodes the information and inputs it to the control center 28.

In operation, each of the trucks 10-20 are operable to move to a select location along the line 22, raise themselves off the ground and impart a predetermined vibration energy to the ground for measurement at the control center. This is then repeated many times along the line 22 until the trucks 10-20 have traversed the entire group of sensors 24. This information is continually measured at control center 28 and data either collected and processed or collected for processing at a later time.

Figure 2:
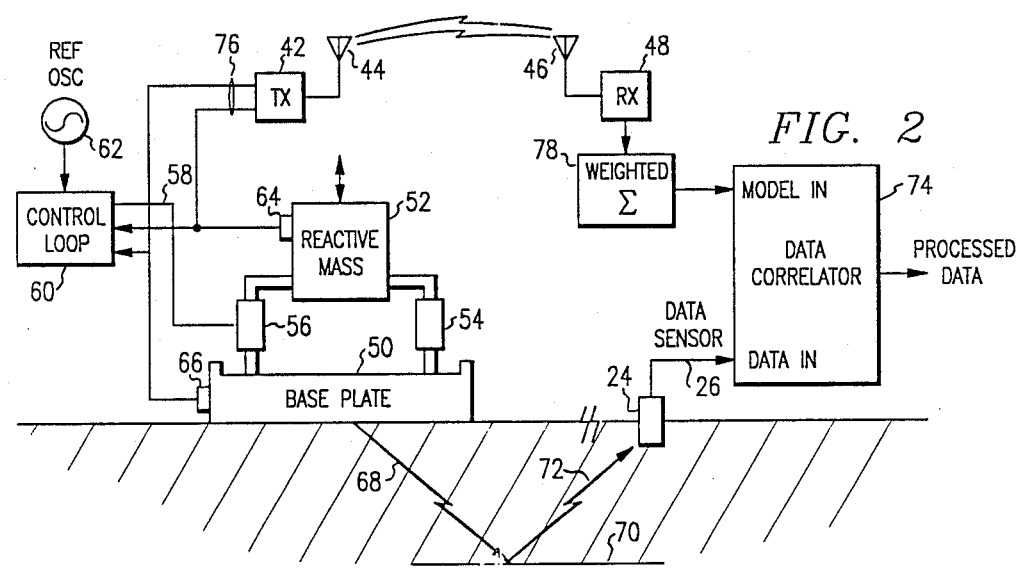
FIG. 2 illustrates a detailed view of one vibration device and the data correlation at the recording station.

Referring now to FIG. 2, there is illustrated a schematic diagram of the vibration trucks 10-20 and also of the data correlator in the control center 28. The vibration trucks 10-20 are essentially comprised of a base plate 50 and a reactive mass 52. As described hereinabove, the reactive mass is basically the truck body with the base plate 50 suspended therefrom by hydraulic cylinders which are illustrated as a hydraulic cylinders 54 and 56 in FIG. 2. The hydraulic cylinders are controlled through a line 58 from a control loop circuit 60. A reference oscillator 62 is provided that is connected to the control loop to provide a reference frequency. The reference oscillator is a triggered type oscillator that sweeps from the low frequency to the high frequency, which, the preferred embodiment is approximately 5-120 Hz.

The loop control circuit 60 receive signals back from the reactive mass and base plate indicating the force imparted by both reactive mass 52 and base plate 50. The measurement is made through the use of an accelerometer 64 disposed on the reactive mass 52 and an accelerometer 66 disposed on the base plate 50. Since force is equal to the product of mass and acceleration, a measurement of the acceleration will be directly proportional to the measurement of the force. Therefore, the accelerometers 64 and 66 provide a signal directly proportional to the force. Since the base plates 50 may not be perfectly motionless with respect to the ground (i.e. it may jump or move up and down), the measurement of any movement of the base plate 50 and any movement of the reactive mass 52 with information regarding their mass will provide the actual force imparted to the earth. These signals enable the loop control circuit 60 to vibrate the reactive mass 52 at the proper frequency, force, amplitude and phase. As described above, this is a conventional and readily available system.

The output of the base plate is illustrated as a shock wave 68 which is reflected off of a structure 70 beneath the surface. A wave 72 is reflected toward the surface and is picked up by a data sensor 24. The data from the data sensor is then input along the line 26 back to the control center 28.

At the control center 28, the data from the data sensor 24 is input to the data port of a data correlator 74. The data correlator can be any conventional type of data correlator for use in seismic measurement, one type of which is manufactured by Calder Digital Development Inc., Model No. FCS5-120 and referred to as a Real Time-Correlator/Stacker. The data correlator essentially receives data in real time and correlates this data against a model signal. In the present situation, the model signal is a swept frequency which is initiated at approximately 5 Hz and swept to a maximum frequency of 120 Hz. A typical waveform for this is illustrated in FIG. 3. As can be seen from the waveform in FIG. 3, the duration of time for the sweep is predetermined. In prior systems, this is essentially a triggered oscillator at the control center 28 which signal is input to the data correlator 74 on the model input. Typically, a sequence of steps occurs in the vibration trucks 10-20 which results in triggering of the sweep. This trigger signal is transmitted to the control center 28 for use in synchronizing the control center reference oscillator.

In the present invention, as illustrated in FIG. 2, the model input is the actual measurement of the force imparted to the earth by the vibration trucks 10-20. This measured signal is basically a weighted sum of the output of the accelerometers 64 and 66 on the reactive mass 52 and the base plate 50, which signals are input to the transmitter 42 on line 76. In the preferred embodiment, each signal is transmitted on a separate channel, the transmitter 42 being a multichannel device. For simplicity purposes only two channels are illustrated for transmitting the signals from the accelerometers 64 and 66.

The receiver 48 also has two channels for each vibration truck and receives the force signals from the accelerometers 64 and 66 which were transmitted by transmitter 42. These signals are then decoded and input into a weighted sum circuit 78 which basically takes the average of the two signals and biases this average towards one or the other of the force signals of the accelerometers 64 and 66. However, this weighted sum can be performed prior to inputting the force signals into the transmitter 42. The purpose of the weighted sum is to account for differences in the force signals generated by accelerometers 64 and 66 due to the differences in the reactive mass 52 and the mass of the base plate 50.

The output of the weighted sum circuit 78 is input to the model input of the data correlator 74. This measure of the actual excitation input to which the measured data can be correlated. The output of data correlator 74 provides processed data. This provides an advantage over the prior system in that a model which may or may not closely resemble the actual force signals imparted to the earth is not needed. This is replaced by an actual measurement.

Figure 4:
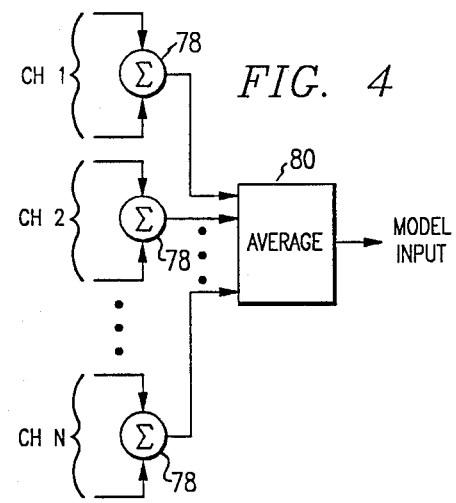
FIG. 4 illustrates a block diagram of the summing circuit for receiving the measured frequency and phase from the vibration devices.

Referring now to FIG. 4 there is illustrated a schematic diagram of the weighted sum circuit 78 for all channels in addition to an averaging circuit 80. In one embodiment of the present invention, only one signal is necessary from the vibration trucks 10-20, assuming that all the trucks operate the same. However, to improve data accuracy and reduce noise to even a larger extent, the force signals from each of the vibration trucks can be measured and transmitted to receiver 48, which is the preferred embodiment. Each of the ground force signals is comprised of two force signals, one from the accelerometer on the respective base plate and one from the accelerometer on the respective reactive mass. This provides two force signals which are received on a given channel. Each channel comprises two subchannels, which are input to the weighted sum circuit 78. There is one weighted sum circuit for each of the channels and respective vibration trucks 10-20. Two subchannels are input to the weighted sum circuit for output to the averaging circuit 80. The averaging circuit 80 essentially takes the average of all the channels. The averaging circuit 80 can be a circuit such as an operational amplifier which has multiple inputs with a series resistor, the series resistor being equal in value for each of the various channels. The output of the averaging circuit 80 provides the model input. As described above, the weighted sum circuit 78 can be disposed at the transmitter side of the system.

By utilizing the averaging circuit 80, variations in the amplitude of force signals for various ones of the vibration trucks 10-20 can be accounted for. Since these variations can result in noise, averaging of the signals provides some offset or correction for this noise.

Referring now to FIG. 5, there is illustrated a schematic diagram of the receiver 48. The output of the antenna 46 is input to a preamplifier 82, the output of which is passed through a band pass filter 84 to a variable attenuator 86. The output of variable attenuator 86 is input to a preamplifier 88 for amplification and input into an eight way power splitter 90. In the preferred embodiment, there are eight channels, or channels and subchannels, provided such that either four vibration trucks can be utilized with two subchannels for each truck or eight vibration trucks can be utilized with one weighted sum force signal output therefrom. The power splitter 90 provides eight outputs, each output going to a separate receiver/decoder 92, one of which is illustrated in detail.

With reference to the detailed receiver/decoder 92, the signal output from the power splitter 90 is input to a PCM receiver 94 which receives a pulse code modulated signal, which signal was modulated as a PCM signal at the transmitter 42, for decoding thereof and output as a digital signal. A frequency module 96 is provided which determines the frequency at which the PCM receiver operates, each of the receiver/decoders 92 operating at a different frequency. The digital output of the PCM receiver 94 is received by a digital formatter 98 which changes the format from the serial format that is received by the PCM receiver 94 to a parallel format. This is provided as a digital output to the correlator 74 and as an input to a gain shift register 100, which gain shift register 100 provides an element of gain to the digital signal. This is input to a digital-/analog (D/A) converter 102 to provide an analog signal which is input to a buffer attenuator 104. The output of the buffer attenuator is an analog signal. An RF status indicator 110 is provided to indicate the presence of an RF signal on a per module basis and a data status indicator 112 is provided to indicate the presence of data. This PCM receiver/decoder is a conventional type system and, for seismic telemetry, one example would be U.S. patent application Ser. No. 528,040 filed Aug. 31, 1983 and assigned to Terra Marine Engineering, Inc.

The receiver/decoders 92 have an access channel 106 that allows the RF signal to be monitored through a select switch 108 which allows a signal from one of the PCM receivers 94 to be output to the RF signal monitor. A gain control switch 114 is provided for outputting a digital signal after being processed through a binary encoder 116 for input to the gain shift register 100 on a bus 117. In order to monitor the output signal, a buffer 118 is provided on each of the receivers/decoders 92 for output to a multiplexer 120 on the control access panel 106. A channel select switch 122 provides a select signal after processing through a binary encoder 124 to output data received at one of the inputs of multiplexer 120. This data is passed through a buffer 126 and a filter circuit 128 for output on a terminal 130 labeled "Monitor Out". A switch 132 is provided for bypassing the filter 128.

Figure 6:
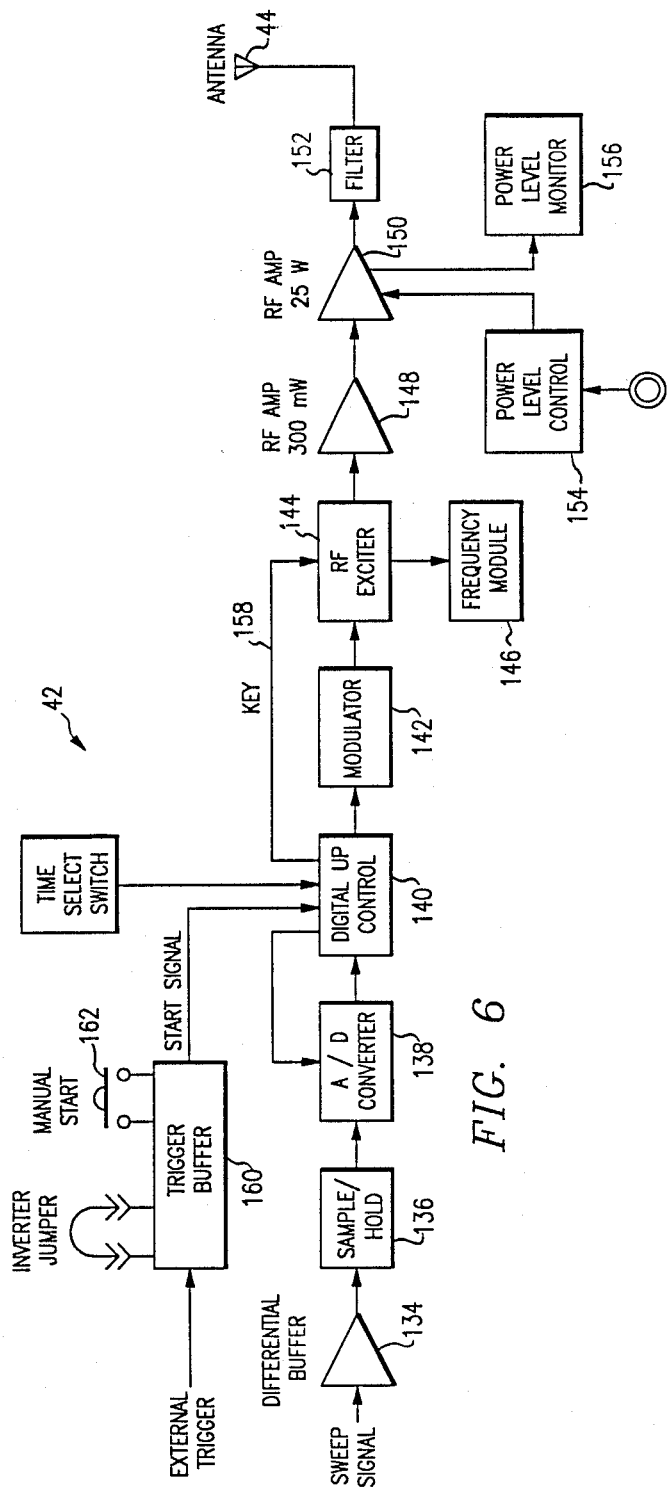
FIG. 6 illustrates a schematic block diagram of the transmitter.

Referring now to FIG. 6, there is illustrated a schematic diagram of the transmitter 42 for a given one of the various channels that are provided. A measured sweep signal is provided which measurement was obtained from the accelerometers 64 and 66, as illustrated in FIG. 2, and is input to a differential buffer 134, the output of which is input to a sample and hold circuit 136. The output of the sample and hold circuit 136, which is an analog signal, is input to an analog/digital (A/D) converter 138. The digital output of the A/D converter is input to a digital microprocessor control 140 which provides various control functions for the signal. The output of the control circuit 140 is input to a PCM modulator 142, the output of which is input to an RF exciter 144. The RF exciter is controlled by a frequency module 146 which determines the frequency at which the RF exciter 144 operates. This provides a modulated RF output which is input to two stages of RF amplification 148 and 150 and the output of which is input to the antenna 44 through a filter 152.

The output amplifier 150 operates at a level of approximately 25 watts whereas the RF amplification stage 148 operates at a power output of approximately 300 milliwatts. The amplifier 150 has a power level control 154 provided and also has a power level monitor 156 provided. The RF exciter 144 is controlled by the control circuit 140 through a "key" line 158 to inhibit the output of the RF exciter 144 when there is no sweep signal. This is only to insure that the RF amplifier 150 is not outputting power unless data is being transmitted. The control circuit 140 is connected to an external trigger signal through a trigger buffer 160 such that the RF exciter 144 is only turned on for a predetermined duration of time after the external trigger signal is received. The trigger buffer 160 has a provision for manually turning on the RF amplifier by a switch 162. The external trigger signal is a signal which is received by all of the vibration trucks 10–20 and also at the control station 28 when the sweep is triggered, as described above.

Although the preferred embodiment has been described in detail it should be understood that various changes, substitutions and alterations can be made therein without departing from the spirit and scope of the invention as defined by the appended claims.

What is claimed is:
1. A seismic system comprising:

a plurality of mobile vibration sources for synchronously imparting low frequency shock waves to the earth at select positions;

means for measuring the force of the shock wave imparted to the earth by each of said vibration sources and each outputting a proportional force signal representative of the force;

sensor means for measuring the reflected energy from the earth that was imparted thereto by said vibration sources to provide measured data;

a plurality of transmit means, each associated with one of said vibration sources, and each for acquiring and encoding said associated proportional force signal and transmitting it over a wireless transmission link;

receive means disposed at a central location and each associated with one of said vibration sources and each for receiving and decoding the associated one of said encoded force signals from said transmission link to provide a model force signal; and a data correlator for receiving the measured data from said sensor means and said model force signals for correlation of said model force signals and the measured data to provide processed data on the output thereof.

2. The seismic system of claim 1 wherein each of said vibration sources comprises a reactive mass and a base plate interacting with said reactive mass, said base plate operable to be disposed adjacent the earth and said reactive mass operable to vibrate at a low frequency with respect to said base plate and said means for measuring comprises an accelerometer disposed adjacent said reactive mass for measuring the acceleration thereof, the output of said accelerometer providing said proportional force signal.

3. The system of claim 2 and further comprising:

a second accelerometer disposed adjacent said base plate for measuring the acceleration thereof to output a second proportional force signal, each of said transmitting means operable to encode and transmit said proportional force signal generated by said accelerometer associated with said reactive mass and said second proportional force signal generated by said accelerometer associated with said base plate; and each of said receive means operable to receive and decode both of said associated transmitted and encoded proportional force signals, said receive means operable for summing said decoded proportional force signals to provide the average thereof.

4. The system of claim 3 wherein the summation of the decoded proportional force signals by each of said receive means is a weighted sum such that one set of proportional force signals is weighted with respect to the other.

5. The system of claim 1 wherein said sensor means comprises a plurality of sensors for sensing reflected energy, said sensors evenly distributed along a given line and said mobile vibration sources operable to move along said line at a plurality of select positions for imparting said shock wave at each of said select positions.

6. The system of claim 1 wherein each of said vibration sources outputs a low frequency shock wave that is comprised of a swept frequency from a first low frequency to a second and higher frequency at a predetermined rate for a predetermined duration of time.

7. The system of claim 1 and further comprising means for averaging said model force signals such that a single model force signal is produced which is comprised of an average of all of said received and decoded signals by each of said receive means.

8. The system of claim 1 wherein said vibration sources each comprise a vibration truck.

9. A seismic system comprising:

a plurality of vibration trucks each imparting a swept low frequency shock wave to the earth at a select position, the frequency of the shock wave for each of said trucks synchronized, each of said vibration trucks having a reactive mass that is operable to vibrate at said swept low frequency with respect to a base plate, the interaction between said reactive mass and said base plate imparting the shock wave to the earth for each of said vibration trucks;

a first accelerometer connected to said reactive mass to measure the acceleration thereof which is proportional to the force of the shock wave for each of said vibration trucks to provide a first proportional force signal;

a second accelerometer connected to said base plate on each of said vibration trucks to measure the acceleration thereof which is proportional to the force of the shock wave to provide a second proportional force signal;

sensor means for measuring reflected shock waves from the earth to provide measured data;

transmitting means for acquiring and encoding each of said first and second proportional force signals from each of said vibration trucks and transmitting said encoded first and second proportional force signals over a wireless transmission link;

receive means for receiving and decoding each of said encoded first and second force signals from said wireless transmission link to provide decoded first and second force signal corresponding to each of said vibration trucks;

means associated with each of said vibration trucks for combining the decoded first and second proportional force signals for the associated one of said vibration trucks and providing a weighted sum therefore in accordance with predetermined weighting factors;

means for averaging the output of said means for combining to provide the weighted sum thereof as a model force signal, and a data correlator for receiving the measured data from said sensor means and said model force signal for correlation thereof to provide processed data.

10. The system of claim 9 wherein said sensor means comprises a plurality of sensors for sensing reflected shock waves, said sensors arranged in a line and being a predetermined distance apart for providing said measured data.

11. The system of claim 9 wherein said swept low frequency shock wave is present for a predetermined duration of time.

12. The system of claim 9 wherein said transmission link comprises a plurality of channels and said transmit means transmits each of said first and second proportional force signals over a separate channel.

13. A method for taking seismic measurement with a vibration type system comprising:

imparting a low frequency shock wave to the earth at a select position with a plurality of vibration trucks;

each of said vibration trucks including a reactive mass interacting with a base plate adjacent the earth to provide a force into the earth;

measuring the acceleration of the reactive mass to provide a first proportional force signal and measuring the acceleration of the base plate to provide a second proportional force signal;

measuring the reflected shock waves in the earth to provide measured data;

encoding and transmitting each of the first and second proportional force signals over a separate channel on a multi-channel wireless transmission link;

receiving and decoding at the central location the encoded first and second force signals from each of the channels of the wireless transmission link and averaging the decoded first and second force signals to provide a model force signal; and receiving the measured data and the model force signal and correlating the two to provide processed data.

14. The method of claim 13 wherein the step of averaging the decoded first and second force signals comprises calculating the weighted sum of the decoded first and second force signals.

* * * * *